Patented May 11, 1943

2,319,183

UNITED STATES PATENT OFFICE 2,319,183

PERCHLOROMETHYL MERCAPTAN REACTION PRODUCT

Darwin E. Badertscher and Henry G. Berger, Woodbury, and Francis M. Seger, Pitman, N. J., assignors to Socony-Vacuum Oil Company, Incorporated, New York, N. Y., a corporation of New York No Drawing. Application January 16, 1940, Serial No. 314,046

7 Claims. (Cl. 260—399)

This invention has to do in a general way with new chemical compositions or reaction products and is more particularly related to a novel group or class of reaction products which we have found to be especially valuable as addition agents for lubricants in that they materially increase the load-carrying capacity of the lubricant to which they are added and at the same time they do not possess the undesirable properties present in many of the so-called extreme pressure bases heretofore developed.

Although the product or class of products contemplated by the present application has been developed especially for use as additive agents for extreme pressure lubricants, it is to be understood that other uses may become apparent to those skilled in the art and that the present application is directed to the reaction product and is not to be construed as limited in any way by this preferred field of use. Lubricant compositions containing reaction products of the type contemplated herein have been made the subject of our copending application Serial No. 177,890, filed December 3, 1937, now Patent No. 2,197,781, of which the present application is a continuation in part.

Considering the preferred field of use in which the products contemplated herein find application, it is a primary object of this invention to provide a compound or reaction product which is soluble in mineral oil fractions of the lubricant type, will not sludge or precipitate out of the oil under conditions encountered in use, and which contains both sulfur and chlorine in chemical combination and in a form sufficiently stable that the product will not injuriously attack metals with which the lubricant comes in contact during storage or use.

We have discovered that the conditions enumerated above are satisfied in the class or group of compounds obtained as products of reaction with perchloromethyl mercaptan as the characterizing reacting agent. These reaction products, in addition to accomplishing the foregoing objects, have the advantage of being cheap and easily prepared.

The perchloromethyl mercaptan derivatives which we have found to be particularly useful as E. P. bases may be broadly divided into two general classifications, namely:

(1) The products obtained by reacting perchloromethyl mercaptan with materials containing reactive hydrogen and reactive metal atoms; and (2) The products obtained by reacting perchloromethyl mercaptan with unsaturated organic materials.

Our invention is directed specifically to those materials obtained by the reaction of perchloromethyl mercaptan with organic compounds of the unsaturated type. In other words, our invention contemplates as new compositions of matter, which find preferred application in the field of extreme pressure lubricants, materials obtained by the reaction of perchloromethyl mercaptan with an organic material containing a double bond, such as for example, unsaturated hydrocarbons (olefines), unsaturated aliphatic acids and their esters, unsaturated aliphatic halides, etc. Typical materials which may be reacted with perchloromethyl mercaptan to obtain products of the type contemplated herein are pentene-2, cracked petroleum stocks, reformer stocks, oleic acid, methyl oleate, unsaturated fatty oils such as lard oil, cottonseed oil, linseed oil, olive oil, etc., which may be classified as esters of unsaturated aliphatic acids, and allyl chloride, etc.

Although it is not our intention to limit the scope of our invention by any theory of reaction, we believe that the reaction of perchloromethyl mercaptan with an unsaturated organic material takes place at the double bond according to the following equation:

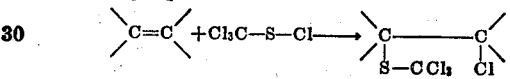

In this way it will be seen that the substitution is made on a single molecule, as contrasted with certain other sulfochlorinating reactions, in which two or more molecules are united to form the reaction product. Our theory for the reaction exemplified by the above equation, therefore, would account for the fact that the products of reaction contemplated by this invention do not tend toward insolubility in the oil as is the case with products obtained by other sulfochlorinating reactions where the larger molecular structures are apparently formed.

Perchloromethyl mercaptan, as indicated above, is a chlorinated substituted sulfur chloride having the formula $Cl_3C$—$SCl$ and can be prepared by the chlorination of carbon disulfide according to the method of Helfrich and Reid (Jour. Amer. Chem. Soc. 43, 591 (1921)). For example, carbon disulfide containing about .4 per cent by weight of iodine was chlorinated in the absence of direct sunlight at a temperature maintained below 25° C. until the volume of the reaction mixture had doubled. This crude product, which contained carbon tetrachloride and sulfur chlorides in addition to perchloromethyl mercaptan, can be used in the preparation of the reaction products contemplated by this invention as extreme pressure lubricant bases, but it is preferable to purify the crude product by distillation on a water bath, followed by steam distillation. The material refined in this way is practically pure.

To illustrate the manner of preparing perchloromethyl mercaptan derivatives or reaction products of the type contemplated by this invention, namely, the reaction products of perchloromethyl mercaptan with unsaturated materials, the following examples are given:

1. Reaction with pentene-2

Forty parts by weight of perchloromethyl mercaptan and 27 parts by weight of pentene-2 were placed in a sealed container and heated to a temperature of 100° C. over a period of 23 hours. The reaction product thus formed was a dark liquid which was distilled to a liquid temperature of 145° C. under vacuum and then steam-distilled to remove unreacted perchloromethyl mercaptan. The residue from the steam-distillation was separated from the water and filtered.

2. Reaction with lard oil

One hundred parts by weight of 70-iodine number lard oil and 58 parts by weight of steam-distilled perchloromethyl mercaptan were mixed together and heated with stirring from a starting temperature of 53° C. to a final temperature of 141° C. over a period of 65 minutes. The reaction mixture was steam-distilled to remove excess perchloromethyl mercaptan and the residue taken up in benzol. Alcohol was added to facilitate separation of emulsified water, and the solvent was distilled off up to a liquid temperature of 115° C. under vacuum. The oil-soluble product thus obtained contained 5.60 per cent sulfur and 16.12 per cent chlorine.

3. Reaction with cottonseed oil

Three hundred and fourteen parts by weight of cottonseed oil and 275 parts by weight of perchloromethyl mercaptan were mixed together and heated with stirring from an initial temperature of 31° C. to a final temperature of 112° C. over an interval of 1 hour. The reaction product was refined as in the preceding example.

4. Reaction with linseed oil

Fifty parts by weight of perchloromethyl mercaptan and 25 parts by weight of linseed oil were mixed together and heated with stirring from an initial temperature of about 25° C. to a final temperature of 147° C. over an interval of 147 minutes. The linseed oil used in this experiment was rather old and probably oxidized and polymerized. The final product obtained was refined according to the procedure used in Example 2 above, and the oil-soluble refined material contained 8 per cent sulfur and 35 per cent chlorine.

5. Reaction with olive oil

A mixture of 252 parts of olive oil and 140 parts of vacuum-distilled perchloromethyl mercaptan was heated with stirring from an initial temperature of 28° C. to a final temperature of 130° C. during 90 minutes. After refining or working up as in the preceding examples, a fairly viscous oil was obtained as the reaction or condensation product, such product containing 19 per cent chlorine and 4 per cent sulfur.

It is to be understood that the foregoing examples are given merely by way of illustration and that the proportions of ingredients, the reaction temperatures, the intervals of reaction, and the method of refinement may be varied within relatively wide limits. It is also to be understood that the materials with which the perchloromethyl mercaptan was condensed are merely illustrative of unsaturated materials which may be used to make the perchloromethyl mercaptan derivatives contemplated by this invention.

In general it may be said that the products contemplated by this invention are the reaction products obtained by reacting perchloromethyl mercaptan with an unsaturated organic material. The reaction is facilitated by heating the reaction mixture to elevated temperature in the neighborhood of from 50° C. to 150° C. The crude product obtained from this reaction may be used in compounding extreme pressure lubricants, but in general it is preferred to purify the product by steam distillation to remove unreacted perchloromethyl mercaptan.

It is to be understood that while we have herein described, for purposes of illustration, certain preferred examples of our reaction products with procedures for synthesizing same, the invention is not limited by the specific examples given but includes within the scope of products and procedures contemplated herein such changes or modifications as fairly come within the spirit of the appended claims. It is further emphasized that while we have stressed the value of these products as improving agents for lubricants, the present invention is directed to the products per se irrespective of the field of use in which they may find application.

We claim:

1. As a new composition of matter, the product obtained by reacting perchloromethyl mercaptan with an unsaturated organic material, said reaction product containing chlorine and sulfur.

2. As a new composition of matter, the product obtained by reacting perchloromethyl mercaptan with an unsaturated hydrocarbon, said reaction product containing chlorine and sulfur.

3. As a new composition of matter, the product obtained by reacting perchloromethyl mercaptan with an unsaturated aliphatic acid, said reaction product containing chlorine and sulfur.

4. As a new composition of matter, the product obtained by reacting perchloromethyl mercaptan with an ester of an unsaturated aliphatic acid, said reaction product containing chlorine and sulfur.

5. As a new composition of matter, the product obtained by reacting perchloromethyl mercaptan with an unsaturated fatty oil, said reaction product containing chlorine and sulfur.

6. As a new composition of matter, the product obtained by reacting perchloromethyl mercaptan with a material selected from the group consisting of lard oil, cottonseed oil, linseed oil, olive oil, and pentene-2, said reaction product containing chlorine and sulfur.

7. As a new composition of matter, the product obtained by reacting perchloromethyl mercaptan with an unsaturated organic material at elevated temperature and then steam-distilling the reaction mixture to remove unreacted perchloromethyl mercaptan, said reaction product containing chlorine and sulfur.

DARWIN E. BADERTSCHER.
HENRY G. BERGER.
FRANCIS M. SEGER.